United States Patent [19]

Nagatomi et al.

[11] Patent Number: 5,188,889
[45] Date of Patent: Feb. 23, 1993

[54] INORGANIC BOARD AND METHOD OF MANUFACTURE THEREOF

[75] Inventors: Wakatsu Nagatomi; Kazuhiko Takai, both of Aichi, Japan

[73] Assignee: Nichiha Corporation, Nagoya, Japan

[21] Appl. No.: 761,850

[22] PCT Filed: Jan. 23, 1991

[86] PCT No.: PCT/JP91/00071
§ 371 Date: Sep. 17, 1991
§ 102(e) Date: Sep. 17, 1991

[87] PCT Pub. No.: WO91/11406
PCT Pub. Date: Aug. 8, 1991

[30] Foreign Application Priority Data

Jan. 23, 1990 [JP] Japan .................................. 2-14614

[51] Int. Cl.[5] ................................................ B32B 9/00
[52] U.S. Cl. ............................. 428/304.4; 428/307.3; 428/448; 428/702; 428/535; 264/257; 264/51; 106/675; 106/698
[58] Field of Search ...................... 428/212, 304.4, 535, 428/307.3, 702, 448; 106/675, 698, 805, 726; 264/51, 257

[56] References Cited

U.S. PATENT DOCUMENTS

| | | | |
|---|---|---|---|
| 599,306 | 2/1898 | Johnson | 106/805 |
| 1,583,713 | 5/1926 | Rankin | 106/805 |
| 3,705,837 | 12/1972 | Breslauer | 106/726 |
| 4,225,359 | 9/1980 | Schneider | 106/698 |
| 4,306,395 | 12/1981 | Carpenter | 264/51 |
| 4,323,527 | 4/1982 | Katzenberger | 264/51 |

*Primary Examiner*—Patrick J. Ryan
*Assistant Examiner*—N. Edwards
*Attorney, Agent, or Firm*—Cooper & Dunham

[57] ABSTRACT

An inorganic board having excellent dimensional stability and excellent insulating properties comprises a pair of surface layers consisting of a hardened mixture of 30 to 60% by weight of cement, 30 to 60% by weight of a silica-containing material, 0 to 15% by weight of pearlite and 5 to 25% by weight of flake and/or wood powder, and a porous core layer consisting of a hardened mixture of 30 to 60% by weight of cement, 30 to 60% by weight of a silica-containing material, 0 to 15% by weight of pearlite and 5 to 25% by weight of wood-fiber bundle.

3 Claims, No Drawings

INORGANIC BOARD AND METHOD OF MANUFACTURE THEREOF

FIELD OF THE INVENTION

The present invention relates to an inorganic board which is light and has a porous structure and excellent insulating properties, and a method of manufacture thereof.

DESCRIPTION OF THE PRIOR ART

Hitherto, a method of manufacture of a porous cement board which is light and has insulating properties such as a heat insulating property, a soundproof property, and the like has been provided said method comprising molding and heating a mixture consisting of a reinforcing material such as wood chip or flake, pulp, fiber and the like and further expandable plastic beads wherein said plastic beads are expanded and melted by heating to form numerous pores in the resulting mold (Tokkai Sho 54-157125, Tokko Sho 63-1276).

Nevertheless, said prior porous cement board has a large moisture and vapor permeability and it is difficult to obtain a board having a flat and smooth surface and excellent appearance since said prior porous cement has numerous holes in its surface. Further, in the case of the prior wood chip-cement board using wood chip as a reinforcing material, it is necessary to increase the molding pressure to obtain the high density of the product so that the product has sufficient strength, and further in the case of the prior pulp-cement board using pulp fiber as a reinforcing material, the density of the mixture of cement-pulp fiber becomes excessive to suppress the expansion of said expandable plastic beads.

DISCLOSURE OF THE INVENTION

The present invention provides an inorganic board comprising a pair of surface layers consisting of a hardened mixture of 30 to 60% by weight of cement, 30 to 60% by weight of silica-containing material, 0 to 15% by weight of pearlite and 5 to 25% by weight of wood flake and/or wood powder, and a porous core layer consisting of a hardened mixture of 30 to 60% by weight of cement, 30 to 60% by weight of silica-containing material, 0 to 15% by weight of pearlite and 5 to 25% by weight of wood-fiber bundle and further it is desirable to use bulky wood-fiber bundle being branched and/or curved and/or bent.

A desirable method of manufacture of said inorganic board is a dry method having a high production efficiency and said dry method comprises process 1, 2 and 3 wherein said process 1 comprises; scattering a mixture A of 30 to 60% by weight of cement, 30 to 60% by weight of silica-containing material, 0 to 15% by weight of pearlite, 5 to 25% by weight of flake and/or wood powder, and 30 to 45% by weight of water on a mold panel to form a mat, scattering a mixture B of 30 to 60% by weight of cement, 30 to 60% by weight of silica-containing material, 0 to 15% by weight of pearlite, 5 to 25% by weight of wood-fiber bundle, 0.5 to 5% by weight of expandable plastic beads and 30 to 45% by weight of water on said mat of said mixture A to form a mat, and scattering said mixture A on said mat of said mixture B to form a mat to obtain a mat having a three layer structure, said process 2 comprises; pressing said mat having a three layer structure to be pre-hardened.

and said process 3 comprises; incubating said resulting mat by heating in an autoclave to soften, expand and contract said expandable plastic beads and to complete hardning of said mat.

DETAILED DESCRIPTION OF THE INVENTION

The present invention is described in detail as follows:

Surface layers

The inorganic board of the present invention has a pair of surface layers which is a hardened mixture of 30 to 60% by weight of cement, 30 to 60% by weight of silica-containing material, 0 to 15% by weight of pearlite and 5 to 25% by weight of flake and/or wood powder.

Said cement may include many kinds of cement such as Portland cement, blast furnace cement, silica cement, fly ash cement, alumina cement, and the like; and said silica-containing material may be an inorganic powder containing silica such as silica sand, silica powder, silica fume, silasballoon and the like.

Said cement and said material silica-containing material react together by silicate-calcium reaction for hardening. To obtain smooth hardening by said silicate-calcium reaction, it is necessary that said mixture A forming the surface layers of said inorganic board include 30 to 60% by weight of cement and 30 to 60% by weight of silica-containing material.

Pearlite may give a light weight and dimensional stability to said inorganic board and therefore said pearlite is a desirable raw material for the present invention but said pearlite may not be indispensable in the present invention. Nevertheless, in a case where pearlite is contained in said mixture to more than 15% by weight, the strength of the resulting inorganic board may decrease and the surfaces of said board may become rough.

Flake and/or wood powder is(are) used as a reinforcing material for the surface layers and it is desirable to use said flake having a size passing wholly through a 10 mm mesh size and having an average 4.5 mm mesh size and said powder having a particle size of 5 to 100 mesh, more desirably a 10 to 30 mesh.

Said flake has a layer reinforcing effectiveness than said powder but in a case where only said flake is used, the density of said surface layers may decrease a little while in a case where only said powder is used, the strength of said surface layers may decrease a little. Accordingly, it is desirable that said flake and said powder are used together and in this case, the mixing weight ratio of said flake and wood powder may be about 80:20 to 20:80. Nevertheless, the object of the present invention may be attained by using only said flake or wood powder. In a case where said flake and/or wood powder is(are) included in said mixture A to less than 5% by weight, sufficient surface layer strength may not be obtained, and in a case where said flake and/or wood powder is(are) included in said mixture to more than 25% by weight, the inflammability of the resulting board may decrease.

To said mixture A constituting said surface layers of said inorganic board of the present invention, further hardening promoter such as magnesium chloride, magnesium sulfate, calcium chloride, calcium sulfate, sodium aluminate, potassium aluminate, aluminium sulfate, water glass, and the like may be added.

Core layer

Said core layer of said inorganic board of the present invention consists of a porous hardened mixture B of 30 to 60% by weight of cement, 30 to 60% by weight of silica-containing material and 5 to 25% by weight of wood fiber-bundle. Cement, silica-containing material and pearlite similar to said surface layers are used and the mixing ratio is also similar to said surface layers.

Said wood-fiber bundle is used as a reinforcing material in said core layer, and said wood fiber-bundle has desirably about a 0.1 to 2.0 mm diameter, about 2 to 35 mm length, more desirably 10 to 30 mm length, and desirably wood-fiber bundle is bulky wood-fiber bundle being branched and/or curved and/or bent. To produce said bulky wood-fiber bundle that is branched and/or curved and/or bent, the wood is dipped in a solution of caustic soda, sodium sulfite, calcium sulfite and the like or heated by steam or dipped in said solution with heating by steam to swell the binders of the mono filaments of said wood, such as lignin, hemicellulose, resin and the like without dissolving them and then said wood is split by controlling the splitting degree so as to retain a part of said resin in said split wood; and comparing such with pulp fiber which is produced by splitting wood to remove said binders almost completely, especially lignin, said bulky wood-fiber bundle has a larger diameter. To control the splitting degree, the distance between a pair of grinding disks is adjusted. Further, in the case of bulky wood-fiber bundle being branched, it is desirable that said bulky wood-fiber bundle has a diameter in the range of about 0.1 to 2.0 mm assuming this is said wood fiber before branching; in the case of bulky wood-fiber bundle being curved and/or bent, it is desirable that said wood fiber has a real length, not the distance between one end and the other end, in the range of 10 to 30 mm.

Said wood-fiber bundle is bulky by said conformation and size and the bulk density of said wood-fiber bundle is in the range of about 0.03 to 0.05 g/cm$^3$. Herein said bulk density is determined by measuring the whole weight of a measuring cylinder having an 8 cm inner diameter and a 2,000 ml volume in which said wood-fiber bundle in an absolute dry condition is packed, obtaining the weight of said wood-fiber bundle by taking away the weight of said measuring cylinder from said whole weight, measuring the volume of said wood-fiber bundle in said measuring cylinder when 1 kg weight is loaded on said wood-fiber bundle, and dividing said weight of said wood-fiber bundle (g) by said volume (cm$^3$).

Said bulky wood-fiber bundle being ranched and/or curved and/or bent become entangled together keeping a small distance in said mixture B and as said wood-fiber bundle has a larger diameter than ordinal pulp fiber, said wood-fiber bundle is somewhat rigid and said wood-fiber bundle do not become entangled together in thread balls and in said wood fibers thus entangled together cement and silica-containing material are held. The rigidity of said wood-fiber bundle is useful to keep a reciprocal distance between said wood-fiber bundle and further, to keep the bulk of said wood-fiber bundle. Accordingly, in a case where the dry method is used to manufacture the inorganic board of the present invention, it may be possible to break up the mixture of said hardening inorganic powder and said wood-fiber bundle by mechanical stirring so that said mixture is easily and uniformly scattered on the mold panel and after the scattering, A may be possible to form a mat which is difficult to deform since said wood-fiber bundle entangle together keeping a reciprocal distance to hold said hardening inorganic powder in said wood-fiber bundle.

Further, in the resulting product, said wood-fiber bundle gives said core layer which has a small density and is consequently light and has a comparative high strength by the special reinforcing effectiveness of said wood-fiber bundle resulting from said reciprocal entangle most of said wood-fiber bundle keeping a reciprocal distance in the matrix as above described.

In the present invention, to make said core layer porous, a method wherein thermoplastic foam particles are mixed in said mixture and then said mixture is hardened and said thermoplastic foam particles are softened to contract by heating is applied. To mix said thermoplastic foam particles in said mixture B, expanded plastic beads are mixed or expandable plastic beads are mixed in said mixture B and said expandable plastic beads are expanded before or when said mixture B is hardened. In this case, when said wood-fiber bundle being branched and/or curved and/or bent is used as wood-fiber bundle, the structure of said mixture B becomes porous so that an advantage is that said expandable plastic beads become uniformly and easily expanded as a result. Said expandable plastic beads may be thermoplastic beads such as polyethylene, polypropylene, polystyrene and the like with which a volatile blowing agent such as propane, butane, pentane, petroleum ether and the like is impregnated. Further, said thermoplastic foam particles or said expandable plastic beads are commonly added to said mixture B in the amount of 0.5% to 5% by weight. In a case where the added amount of said thermoplastic foam particles or said expandable plastic beads is less than 0.5% by weight, the pore ratio of said core layer may decrease and the insulating properties of the resulting product may not be sufficient and in a case where the added amount is more than 5% by weight, the inflammability of the resulting product may decrease since the organic component ratio in the resulting inorganic board may be excessive.

Method of manufacture

It is desirable to adopt the dry method wherein the continuative process is easily applied and a simple apparatus can be used as the method of manufacture of the inorganic board of the present invention. In Process 1 of said dry method, said mixture A is scattered on the mold panel to form a mat, and then said mixture B is scattered to form a mat on said mat and further, said mixture A is scattered to form a mat on said mat, wherein 30 to 45% by weight of water is added to said mixture A and said mixture B respectively for the hardening reaction. In a case where said bulky wood-fiber bundle being branched and/or curved and/or bent is used in said mixture B, said mixture B is easily broken up and uniformly scattered on the mold panel. In a continuative process, a plural number of said mold panels are placed in a belt conveyer. Said mixtures of raw materials scattered on said mold panel are pressed a little by a roller and the like if desirable to form a mat and said mat is pressed and pre-hardened in the existence of water to form a desirable shape as in Process 2. The condition of said pressing may commonly be a press pressure of about 10 to 20 kg/cm$^2$, a temperature of about 60° to 80° C., and a time of about 20 to 30 hours, and steam is commonly used for heating. Said pressing may be carried out by pressing said mat between a pair of mold panels and a desirable pattern or embossing may be formed on the surfaces of said mold panels.

A pre-hardened mat resulting from said pressing and pre-hardening in Process 2 is incubated in an autoclave in Process 3. Said incubating condition may commonly be a pressure of 10 to 20 kg/cm², a temperature of 160° to 180° C. and a time of 5 to 10 hours.

During said incubation in said autoclave, a silicate-calcium reaction between cement and a silica-containing material may be completed and in a case where expandable plastic beads are added to said core layer, said expandable plastic beads may be completely expanded and the resulting plastic foam particles may be softened and said volatile blowing agent in the cells of said plastic foam particles may go to the outside so that said plastic foam particles may rapidly contract to form a layer number of pores in said core layer. Further, a plastic coating layer originating from said thermoplastic foam particles may be formed on the inner wall of said pores.

As above described, said inorganic board of the present invention is manufactured and the thickness of said surface layers of said inorganic board may commonly be 10 to 30% of the total thickness, and the density of said surface layers may commonly be 0.9 to 1.1 g/cm³

In the present invention, since said surface layers and said core layer contain 30 to 60% weight of cement and 30 to 60% by weight of a silica-containing material respectively, the hardening of each layer by silicate-calcium reaction may be smoothly performed. Further, in a case where said dry method is adopted, said silicate-calcium reaction is substantially completed by said autoclave incubation and the mold is hardened having a final size so that said hardened mold may be little influenced from the environment to increase the dimensional stability of the resulting product. Further, said surface layers contain 5 to 25% by weight of said flake and/or wood powder so that said surface layers have a high density and excellent flat surfaces. Further, said core layer contains 5 to 25% by weight of said wood-fiber bundle and is porous so that said core layer is light and has excellent insulating properties. Still further, said surface layers and said core layer respectively contain a wooden reinforcing material, namely flake, wood powder, and wood-fiber bundle, in the amount of less than 25% by weight so that the resulting inorganic board of the present invention has excellent inflammability.

In a case where a bulky wood-fiber bundle being branched and/or curved and/or bent is used as said wood-fiber bundle, the bulk density of the resulting core layer may become small while the strength of said core layer will not decrease and the expansion of said expandable plastic beads may be smoothly and uniformly carried out.

Embossing may be performed on the surfaces of said inorganic board of the present invention and in this case very clear and deep embossing is easily performed since said board has surface layers having high densities while the core layer thereof is porous, consequently a suitable cushioning property is realized.

Accordingly, in the present invention, an inorganic board which is light and has excellent dimensional stability, a relative high strength, excellent insulation properties, and excellent inflammability and further, clear and deep embossing can be performed, is obtained.

EXAMPLE

EXAMPLE 1

(1) The formulation of mixture A is as follows:

| Portland cement | 47% by weight |
| --- | --- |
| Silica sand | 30% by weight |
| Pearlite | 10% by weight |
| Flake *1 | 5% by weight |
| Wood powder *2 | 5% by weight |
| Aluminium sulfate | 3% by weight |

*1 Flake having an average mesh size of 4.5 mm and an average thickness of 0.6 mm is used.
*2 Wood powder having a 20 mesh of an average particle size is used.

(2) The formulation of mixture B is as follows:

| Portland cement | 46% by weight |
| --- | --- |
| Silica sand | 28% by weight |
| Pearlite | 10% by weight |
| Wood-fiber bundle * | 10% by weight |
| Expandable polestyrene beads (pre-expanded) | 3% by weight |
| Aluminium sulfate | 3% by weight |

* Wood-fiber bundle, having an average diameter of 1.0 mm, and a length of 20 mm and being branched and/or curved and/or bent is used.

(3) 40% by weigth of water is respectively added to said mixture A and mixture B and said mixture A is scattered on the lower mold panel to form a mat having an 8 mm thickness and then said mixture B is scattered on said mat to form a mat having a 50 mm thickness and further, said mixture A is scattered on said mat to form a mat having an 8 mm thickness, and the upper mold panel is put on said mat to press previously and then pressing and harden at a pressure of 10 kg/cm² and a temperature of 70° C. for 25 hours is carried out. The resulting laminated mold is a board having a thickness of 18 mm and said laminated mold is incubated in an autoclave at a pressure of 15 kg/cm² and at temperature of 165° C. for 7 hours to harden the cement and silica sand in said laminated mold by silicate-calcium reaction and the expandable polystyrene beads of the core layer are expanded and then softened to contract.

The resulting inorganic board has a flat smooth surface having a high density but is light and has excellent insulating properties.

EXAMPLE 2

(1) The formulation of mixture A is as follows:

| Cement *1 | 50% by weight |
| --- | --- |
| Silica-fume | 30% by weight |
| Pearlite | 10% by weight |
| Wood powder *2 | 10% by weight |

*1 A mixture of Portland cement and almina cement (1:1 weight ratio) is used as said cement.
*2 Wood powder the same as used in Example 1 is used.

(2) The formulation of mixture B is as follows:

| Cement *1 | 50% by weight |
| --- | --- |
| Silica-fume | 27% by weight |
| Pearlite | 10% by weight |
| Wood-fiber bundle *2 | 10% by weight |
| Polystyrene foam particles | 3% by weight |

*1 Cement having the same component as used in said mixture A is used.
*2 The same wood-fiber bundle, as used in Example 1 is used.

(3) An inorganic board is manufactured by the same dry method as Example 1. In said process, said polystyrene foam particles are softened to contract during incubation in an autoclave.

The resulting inorganic board has a flat smooth surface having a high densitybut is light and has excellent insulating properties.

EXAMPLE 3

(1) The formulation of mixture A is as follows:

| Portland cement | 47% by weight |
|---|---|
| Silasballoon | 10% by weight |
| Silica sand | 30% by weight |
| Flake *1 | 5% by weight |
| Wood powder *2 | 5% by weight |
| Sodium aluminate | 3% by weight |

*1 The same flake as used in Example 1 is used.
*2 The same wood powder as used in Example 1 is used.

(2) The formulation of mixture B is as follows:

| Portland cement | 46% by weight |
|---|---|
| Silasballoon | 10% by weight |
| Silica sand | 28% by weight |
| Wood-fiber bundle *1 | 10% by weight |
| Expandable polystyrene beads (pre-expanded) | 3% by weight |
| Sodium aluminate | 3% by weight |

*1 The same wood-fiber bundle as used in Example 1 is used.

(3) An inorganic board is manufactured by the same dry method.

The resulting inorganic board has a flat smooth surface having a high density but is light and has excellent insulating properties.

We claim:

1. An inorganic board comprising a pair of surface layers consisting of a hardened mixture of 30 to 60% by weight of cement, 30 to 60% by weight of a silica-containing material, 0 to 15% by weight of pearlite and 5 to 25% by weight of a reinforcing material selected from the group consisting of wood flake and wood powder; and a porous core layer consisting of a hardened mixture of 30 to 60% by weight of cement, 30 to 60% by weight of silica-containing material, 0 to 15% by weight of pearlite, 5 to 25% by weight of wood-fiber bundle, and 0.5 to 5% by weight of expandable plastic beads.

2. An inorganic board of claim 1, wherein said wood-fiber bundle is a balky wood-fiber bundle being branched and/or curved and/or bent.

3. A method of manufacture of an inorganic board of claim 1 comprising processes 1, 2 and 3 wherein
said process 1 comprises: scattering a mixture A of 30 to 60% by weight of cement, 30 to 60% by weight of a silica-containing material, 0 to 15% by weight of pearlite, 5 to 25% by eight of a reinforcing material selected from the group consisting of wood flake and wood powder, and 30 to 45% by weight of water on a mold panel to form a mat, further scattering a mixture B of 30 to 60% by weight of cement, 30 to 60% by weight of a silica-containing material, 0 to 15% by weight of pearlite, 5 to 25% by weight of wood-fiber bundle, 0.5 to 5% by weight of expandable plastic beads and 30 to 45% by weight of water on said mat of said mixture A to form a mat, and further scattering said mixture A on said mat of said mixture B to form a mat to obtain a mat having a three layer structure;
said process 2 comprises: pressing said mat having a three layer structure to be pre-hardened; and
said process 3 comprises: incubating said resulting mat by heating in autoclave to soften, expand and contract said expandable plastic beads and to complete hardening of said mat.

* * * * *